(12) United States Patent
Ferrucci et al.

(10) Patent No.: US 8,560,300 B2
(45) Date of Patent: Oct. 15, 2013

(54) ERROR CORRECTION USING FACT REPOSITORIES

(75) Inventors: David A. Ferrucci, Hawthorne, NY (US); David C. Gondek, Hawthorne, NY (US); Wlodek W. Zadrozny, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 1071 days.

(21) Appl. No.: 12/556,090

(22) Filed: Sep. 9, 2009

(65) Prior Publication Data

US 2011/0060584 A1 Mar. 10, 2011

(51) Int. Cl.
*G06F 17/21* (2006.01)

(52) U.S. Cl.
USPC .................... 704/9; 704/8; 715/210; 715/217

(58) Field of Classification Search
USPC .................... 704/9, 8; 715/210, 217
See application file for complete search history.

(56) References Cited

U.S. PATENT DOCUMENTS

| | | | | |
|---|---|---|---|---|
| 6,167,367 | A * | 12/2000 | Chang et al. | 704/8 |
| 6,847,734 | B2 | 1/2005 | Hamamura | |
| 7,013,264 | B2 | 3/2006 | Dolan et al. | |
| 7,137,076 | B2 | 11/2006 | Iwema et al. | |
| 2004/0122846 | A1 * | 6/2004 | Chess et al. | 707/102 |
| 2007/0225980 | A1 | 9/2007 | Sumita | |
| 2009/0132911 | A1 * | 5/2009 | Detlef et al. | 715/234 |
| 2009/0132991 | A1 * | 5/2009 | Ganai et al. | 716/18 |

FOREIGN PATENT DOCUMENTS

JP 02005267663 A * 9/2005

OTHER PUBLICATIONS

Etzioni et al.,"Open information extraction from the web" Communications of the ACM , vol. 51 Issue 12, Dec. 2008 pp. 68-74.*
Berger et al., A Maximum Entropy Approach to Natural Language Processing, Association for Computational Linguistics, 1996.
Wikipedia, Speech Recognition, http://en.wikipedia.org/wiki/Speech_recognition.
Wikipedia, Handwriting Recognition, http://en.wikipedia.org/wiki/Handwriting_recognition.
Wikipedia, Intelligent Character Recognition, http://en.wikipedia.org/wiki/Intelligent_character_recognition.
Wikipedia, Optical Character Recognition, http://en.wikipedia.org/wiki/Optical_character_recognition.
Wikipedia, Cloud computing, http://en.wikipedia.org/wiki/Cloud_computing.
Wikipedia, UIMA, http://en.wikipedia.org/wiki/UIMA.
Apache incubator, Apache UIMA, http://incubatorapache.org/uima/.
Mangu et al., Error Corrective Mechanisms for Speech Recognition, IBM.
Brill, Transformation-Based Error-Driven Learning and Natural Language Processing: A Case Study in Part-of-Speech Tagging, Association for Computational Linguistics, 1995.

* cited by examiner

*Primary Examiner* — Vincent P Harper
(74) *Attorney, Agent, or Firm* — Scully, Scott, Murphy & Presser, P.C.; Daniel P. Morris, Esq.

(57) ABSTRACT

The disclosed system and method apply stores of factual information to correct errors in digital text, for example, generated from OCR, speech and/or handwriting recognition devices, and other automatic recognition devices. A text produced by OCR, speech recognition, handwriting recognition, and others may be processed to extract discussed facts. Databases of facts are searched based on information in the text. After comparing facts asserted in the text with the factual data from the databases, suggested corrections of the text are produced.

20 Claims, 4 Drawing Sheets

ERROR CORRECTION USING FACT REPOSITORIES

BACKGROUND

The present disclosure relates generally to computer systems, artificial intelligence and intelligence analysis, and more particularly to correcting errors using fact repositories.

Computers are used to transcribe speech and handwriting. They are also used to convert scanned images of text into text. Examples of such processing include optical character recognition (OCR) that converts paper documents into digital form by scanning, speech recognition that converts voice into text, and handwriting recognitions. Inevitably, errors occur in computerized text and voice and other such processing. Errors also originate from other sources, e.g., mistyped data and other mistakes made by people entering the data.

Existing systems currently correct errors based on a "language model", i.e. an encoding of statistical information about co-occurrence of words or word patterns. For instance, existing solutions correct some spelling errors or grammatical errors. However, they do not contemplate correcting other context and/or semantic type of errors. Similarly, many repositories of data such as relational and extended markup language (XML) databases, textual and video archives have errors, either in their content or in associated metadata. Other than for simple cases such as a mismatch between a zip code and a town name, current automated error correcting computer systems or software do not handle correcting such errors.

BRIEF SUMMARY OF THE INVENTION

A system and method for correcting error in digital text using fact repositories are provided. The method in one aspect may include searching computer data repository storing information for one or more relevant facts associated with input digital text and extracting one or more facts postulated in the input digital text. The method may also include comparing the one or more facts postulated in the input digital text with the one or more relevant facts. The method may further include analyzing one or more differences between said one or more facts postulated in the input digital text and said one or more relevant facts resulting from the comparing step, and transforming the input digital text into corrected digital text by correcting the input digital text using evidence resulting from the analyzing step.

A system for error correction using fact repositories, in one aspect, may include one or more fact repositories stored on one or more storage devices. A correction module executable on a computer processor is operable to search the fact repositories for one or more relevant facts associated with input digital text. The correction module may be further operable to extract one or more facts postulated in the input digital text and determine one or more differences between said one or more facts postulated in the input digital text and said one or more relevant facts retrieved from the fact repositories, the correction module may be also operable to transform the input digital text into corrected digital text using evidence resulting from the determined differences.

A program storage device readable by a machine, tangibly embodying a program of instructions executable by the machine to perform methods described herein may be also provided.

Further features as well as the structure and operation of various embodiments are described in detail below with reference to the accompanying drawings. In the drawings, like reference numbers indicate identical or functionally similar elements.

DETAILED DESCRIPTION

The system and method of the present disclosure in one embodiment corrects errors occurring in computerized text and voice processing and the like using fact information. Many OCR errors such as misinterpreted names and locations, speech recognition errors, handwriting recognition errors and any other conversion from analog to digital medium may be automatically corrected by using facts. Similarly, many repositories of data such as relational and XML databases, textual and video archives have errors, either in their content or in associated metadata. The system and method of the present disclosure in one embodiment apply to the textual part of such databases, i.e., textual fields and associated metadata. The novelty of the solution, in one aspect, lies in applying stores of factual information, for example, large scale stored of factual information, to correct some of such errors.

In one embodiment, facts (e.g., relations between entities) are extracted from resources such as the World Wide Web, databases, and/or other resources and applied to provide error correction. For instance, facts extracted to those resources are compared to the facts in electronically processed documents such as OCR, documents rendered by speech recognition programs. Rather than focusing on words coming from OCR, speech recognition, or other automated recognitions, the system and method of the present disclosure may focus on facts expressed by these words independently of the distance between the words, and compare facts to known facts.

For example, names and dates are often misrecognized by OCR. E.g., "rn" ("r n" is confused with "m", "lr" with "k" etc. Fractions are very often misrecognized, and confused with percent signs (and vice versa). Likewise in spoken language many names are pronounced similarly. For instance, "Nick Adams" and "Mike Adams" may sound the same to the speech recognizer, especially in less then perfect conditions. When encountering the sentences such as "I liked Nick Adams in the Rebel", "I liked Mike Adams' voice on the radio when I was growing up in Boston", the state of the art speech recognition systems may not be able to resolve the ambiguity. Even the best n-gram based recognizers may not have the 5 gram "Nick Adams in the Rebel". Further, this string appears only a few times on the web, as does the string, "Mike Adams' voice". Thus, even with the language model taking into account the whole Internet, the second sentence would likely be misrecognized.

On the other hand, the factual association of "Nick Adams" as an actor in the movie, "The Rebel" is readily available through the Internet Movie Database (IMDB). Similar association of Mike Adams with Boston and radio can be found by, for example, mining Wikipedia™. The system and method of the present disclosure in one embodiment may retain the ambiguity from the recognizer, and correct it based on available facts.

In another application, companies like Amazon™ and Google™ scan books to enable indexing and searching. The index quality can be automatically improved by fact based correction procedures based on large collections of (previously) extracted facts (relations between individual tokens). Legal companies may need to convert scanned records to text. Other possible application area may include medical forms that could be scanned with higher accuracy by leveraging, e.g., relationships among data such as patient's social security number, type of ailment, surgery date, and the like information or facts. Spelling correction tools such as those in Microsoft™ Word Editor or other electronic editors, may benefit from understanding relationships between entities, e.g., to avoid attempts of error correction on unknown names. Search engines currently use error correction schemes based on frequency, but those techniques may be improved by incorporating factual relations.

As storage becomes cheap, the idea of storing huge amount of factual information is becoming more feasible. Such repositories with existing speech recognition, OCR and handwriting recognition system, and other automatic recognition systems may be connected using existing technologies. The system and method of the present disclosure provide new techniques for extracting factual information and make the quality of such repositories of facts better.

Figure 1:
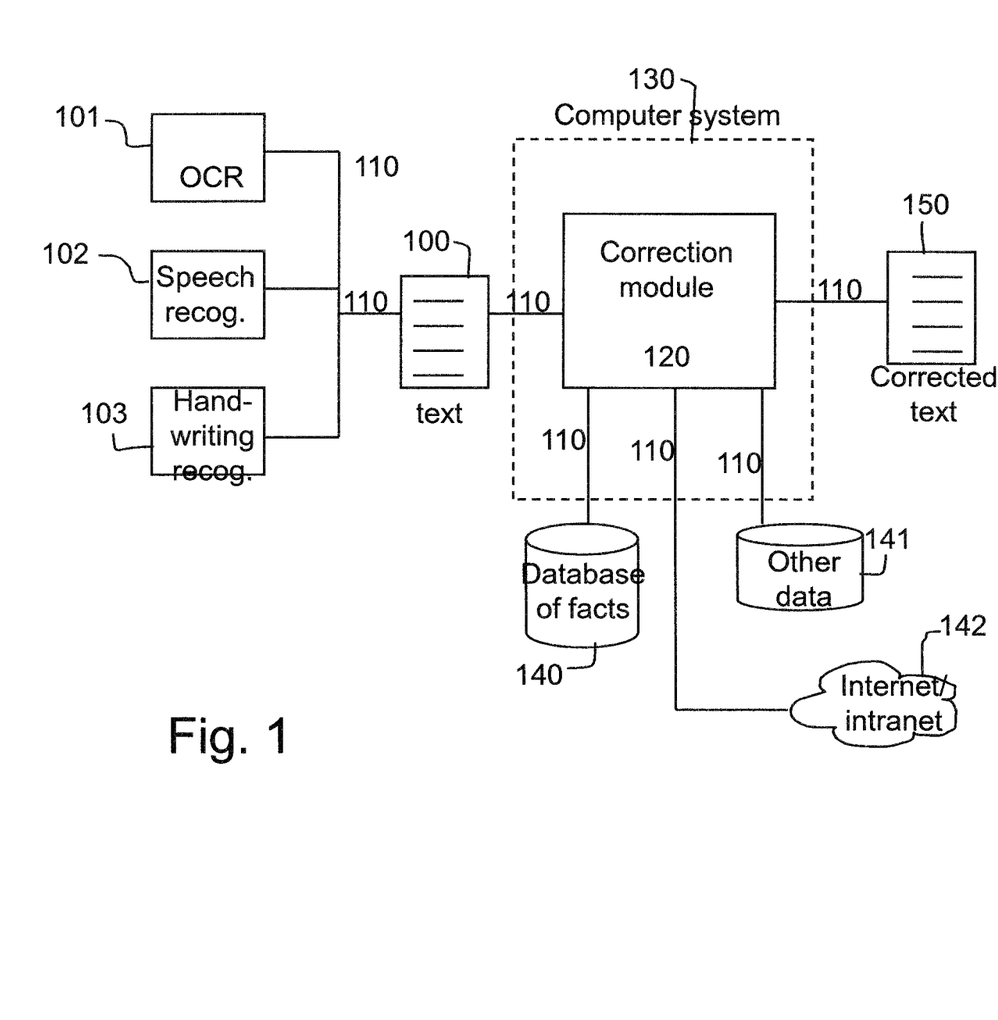
FIG. 1 is a schematic diagram showing functional components of the present disclosure in one embodiment.

FIG. 1 is an architectural diagram showing functional components of the present disclosure in one embodiment. Possibly erroneous or ambiguous digital text 100, for instance, generated from processing tools such as OCR 101, Speech recognition 102, handwriting recognition 103 and other such conversion tools, is transformed into a corrected text 150 using a collection of facts, for instance, contained in one or more various repositories 140, 141, 142 and the like. Digital text 100, represented as a computer file or object with plain or annotated text (e.g., XML), is produced by one or more of the devices such as an OCR device 101, a speech recognition device 102, and a handwriting recognition device 103. Another such device may include but is not limited to a lip reading camera. In one aspect, the digital text 100 may be generated or produced using such recognition or processing devices in batch mode or interactively one at a time. The digital text 100 may be transferred along the bus or network 110 or the like transmission medium to a correction module 120. The correction module 120 generates corrected text 150, which may be then sent to a user or another computer.

In one embodiment, an interface between the recognition or processing devices such as 101, 102, and 103, but not limited to those only, may exist between those devices and the correction module 120, for instance, to dynamically or automatically transfer the processed text 100 to the correction module 120. In another aspect, the correction module 120 may be fed the processed text 100 as an input, for example, as stored on a storage or memory device of the computer system 130. The interface may be software interface such as the application interface program (API).

The correction module 120 may be part of a computer system 130, possibly comprising other modules and functional components such as databases, data processing modules, and Input/Output (I/O) functions and devices. The computer system 130 may be a stand alone single processor computer or a cloud comprising many distributed processors or have other configurations. The correction module 120 has access to databases of factual information. The databases may include, but are not limited to, a database of facts 140 which can be in textual form, in a semi-structured form (e.g., Wikipedia™ XML document), or a structured database or records. Other databases may be connected to the correction module 120 and/or used. Other relevant data 141 may include statistical information about words and phrases (e.g., Google™ n-grams and statistical language models). The correction module 120 may be also connected to the Internet 142, for example, via a network 110 (e.g., wired and/or wireless), for instance, to leverage search and question answering by using Internet accessible tools such as Google™, ask.com™, and the like.

Figure 2:
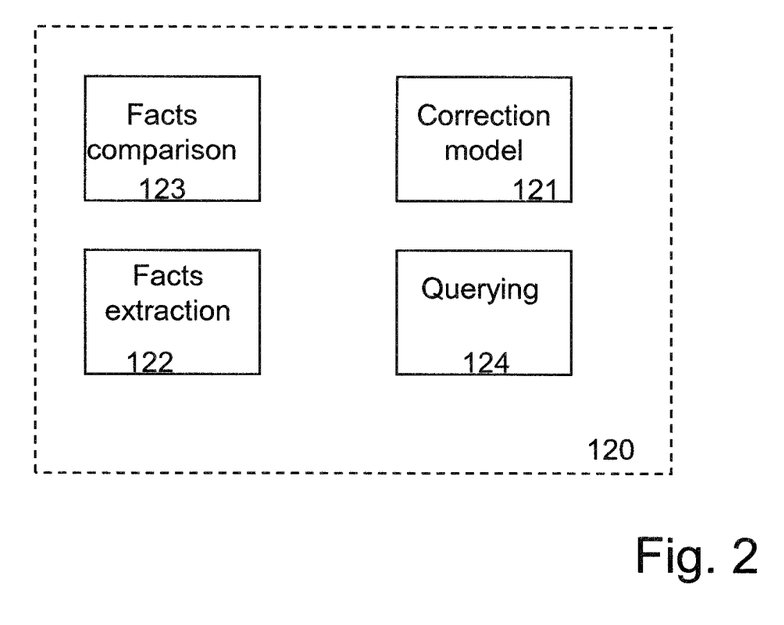
FIG. 2 shows functional components of the correction module in one embodiment of the present disclosure.

FIG. 2 shows a plurality of functional components of the correction module in one embodiment. A correction model 121 suggests opportunity to correct the original digital text 100. The correction model 121 may be a trained model or a machine learning model that is able to detect fact consistencies. For example, given a collection of entities and relations, and statistical distribution of such relations, it may find both logical inconsistencies (e.g. between an assertion in a text and an assertion in a database) and statistical improbabilities (e.g. a monthly car payment relation in the amount of $52455, which may have been caused by a scanning error of missing a period). Once the possible errors are found and scored, the machine learning model, for example, also using available facts can suggest opportunities for corrections and rank them. For example, $52455 may produce the opportunities to correct to $524.55 based on the statistical distributions of both car payment amounts and OCR errors, as well as $527.55 based on a set of annotations in the digital text 100 postulating that the digit 4 could be a result of misrecognizing 7 with some probability. The same processing may be applied to facts. If IMDB is deemed reliable (statistically speaking), "Mike Adams" will be corrected to "Nick Adams" by the correction model 121.

Facts extraction module 122 extracts facts represented in the text 100. Briefly, fact extraction (also referred to as information extraction) retrieves information from natural language text, that is, automatically extracts structured information. Structured information refers to categorized and contextually and semantically well-defined data, as is the case with database tables or RDF data on the "semantic web" (e.g., see http://en.wikipedia.org/wiki/Semantic_Web). Structured information, for example, may be categorized into a given domain. Unstructured data (e.g., ordinary text in natural language such as English) may be transformed into a relational from, graphical form, and/or annotated with tags such as XML tags and/or other structural form. Facts extraction module 122 processes unstructured machine-readable documents (e.g., natural language text) and extracts formal information, i.e., structured information. Using the extracted structured information, a logical reasoning module or the like may draw inferences based on the logical content of the input data. Thus, structured information allows for automated computation of facts and inferences on the previously unstructured data. Fact extraction module 122 may employ any known or will be known techniques to extract structured information.

Fact comparison module 123 computes the difference between facts represented in the text 100 and other collection of facts. Querying module 124 uses the information contained in the text 100 to query data repositories (e.g., 140, 141 and 142 FIG. 1) and delivers a collection of facts that can be compared with the facts represented in the text 100. This may accomplished, for example, by creating a search query based on strings in the text 100 to unstructured or semi-structured data sources and subsequently using the fact extraction module 122 to get the facts, or checking the structured databases using, for example, an SQL query to determine if relations postulated by the text 100 hold true.

Figure 3:
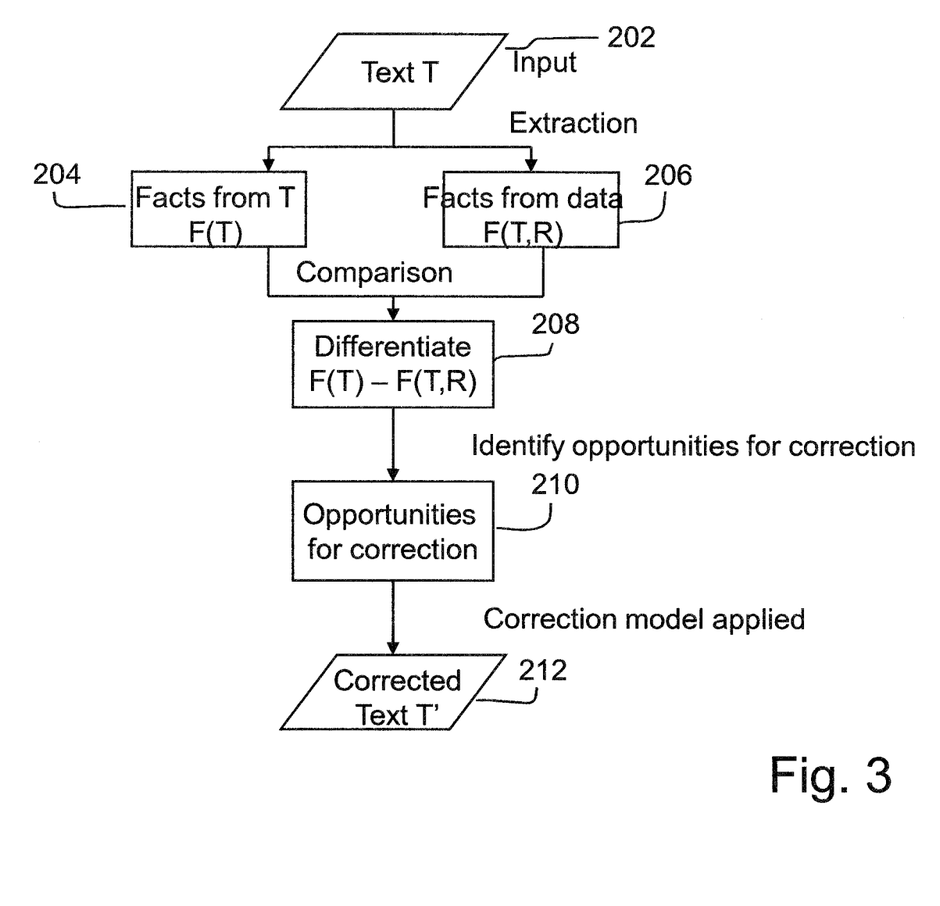
FIG. 3 is a flow diagram illustrating an algorithm in one embodiment for correcting errors using factual repositories.

FIG. 3 is a flow diagram illustrating an algorithm for correcting errors using fact repositories. At 202, digital text, T (for example, represented in FIG. 1 by 100), produced by text or voice or other processing devices, modules, or tools, is input. For instance, the correction module (120 FIG. 1) may receive the digital text as input. At 204, facts, F(T), are extracted from the input digital text. At 206, facts, F(T,R), related to the text items or elements in the digital text are extracted from data repositories. The facts extraction functional component (122 FIG. 1) may perform the extracting functionality of steps 204 and 206 in one embodiment.

At 208, the facts extracted at step 204 and the facts extracted at step 206 are compared. In one embodiment, the comparison module (FIG. 1 at 123) identifies facts in F(T) which are contradicted by the facts obtained from F(T,R). To identify contradicting facts, the module may construct a mapping between the elements of F(T) and F(T,R), and perform an analysis of the coherence of the facts expressed over these entities in both sets. In one embodiment, a formal ontology may be utilized. In the embodiment in which a formal ontology is used, a mapping is produced by recognizing the components of the ontology (entities, relations, etc.) appearing in both F(T) and F(T,R). In cases where multiple ontologies are used, or no ontology is present, or ontological and extra-ontological components are mixed, disambiguation may be performed within the correction phase so as to produce a mapping between the elements mentioned among F(T) and those mentioned among F(T,R). Such a mapping may be produced using Natural Language Processing techniques such as word-sense disambiguation, relation extraction, and entity disambiguation.

At 210, the differences between facts from step 204 and step 206 are analyzed to produce opportunities for correcting the digital text, for example, by the correction model 121. For example, once the mapping as described above is produced, factual consistency is checked by applying a model of factual consistency in order to identify those recognized facts which are inconsistent with the body of repository facts, as described above. In addition, the correction model 121 may discriminate between consistent and inconsistent facts. The fact "John Lennon was born in 1940" is inconsistent with the fact "John Lennon was born in 1914", whereas "John Lennon performed in Liverpool" is not inconsistent with the fact "John Lennon performed in Shea Stadium." Consistent facts may be unsupporting as in the previous example, or supporting ("John Lennon performed in Shea Stadium" supports that "John Lennon performed in New York").

A correction model (121 FIG. 1) may be trained over a training corpus of facts. Facts are represented as a collection of features over the components of the fact, e.g., identifying relation types, participating entities, and more detailed information such as entity types and properties. This may be particularly useful in an embodiment where a formal ontology is not used as inconsistency identification may depend not on the argument alone but on particular features of arguments. For instance, "John Lennon was born in 1940" is not inconsistent with "John Lennon was born in Liverpool" despite sharing the same linguistic expression up to the final term.

In one embodiment, the correction module may include one or more models trained via techniques such as Maximum Entropy. Maximum Entropy is described in detail in <www.ldc.upenn.edu/acl/J/J96/J96-1002.pdf>. The trained model may be then used to provide a judgment for the consistency of each of the facts in F(T). In the judgment process, those features contributing most to the inconsistency are identified. Potential corrections are automatically evaluated to identify the most probable correction subject to a distance function constraint from the original text to restrict the set of candidate corrections. Scores from the recognition phase (e.g., recognizer confidence in the strings "Mike Adams" and "Nick Adams") may be incorporated as prior probabilities in the model. The model may be adapted to add and update facts in an online manner. Correction model 121 may, if desired, produce a score identifying the degree of inconsistency. This allows for different levels of correction to be applied according to more or less aggressive strategies, or for highlighting of corrections in a form indicating the certainty.

In the next step, the digital text is corrected based on evidence from the analyzed differences to produce corrected text 212. In one embodiment, and as described above in the discussion of 210, there may be two main steps of this process: the recognition and scoring of possible errors, and the correction step or steps. The recognition and scoring step may compare facts and statistical distributions to point to the places possibly containing errors; this is an application of a model that was trained on examples of such errors. This model can be dynamically adapted with each application of the system. The correction step leverages fact repositories to suggest replacements and/or corrections—using "facts from data F(T,R)" of 206 and the correction model, and can be done either in batch (one step) or interactively (asking users to verify and/or suggest corrections). The known or will be known methods of correcting, e.g. the ones based on statistical language models, can also be combined with this step.

In one aspect, the unstructured data of the digital text may be converted or represented as structured forms such as relational tables in order to process them according to the algorithm illustrated in FIG. 3. Ambiguity of the results of the recognition devices (e.g., 101, 102, 103 FIG. 1) may be fully represented, i.e., all choices with the associated probabilities may be encoded in the text. Similarly, rich data structures may be used for representing facts to contain details that would allow a skilled person in the art to build such fact representations. For instance, Unstructured Information Management Architecture (UIMA) framework may be used to implement the algorithm illustrated in FIG. 3. Briefly, UIMA is an open, industrial-strength platform for unstructured information analysis and search. Thus, the digital text and relevant facts retrieved from data repositories may be represented as a UIMA CAS (Common Analysis System). Several types of data architecture may be supported within the same framework, from a standalone system to a cloud.

In the system and method of the present disclosure, both data and computation (e.g., computer processing) can be distributed, for instance, using cloud computing. The model or the like can be updated in real-time leveraging or using stream computing, for example, as in IBM Corporation's System S.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 4:
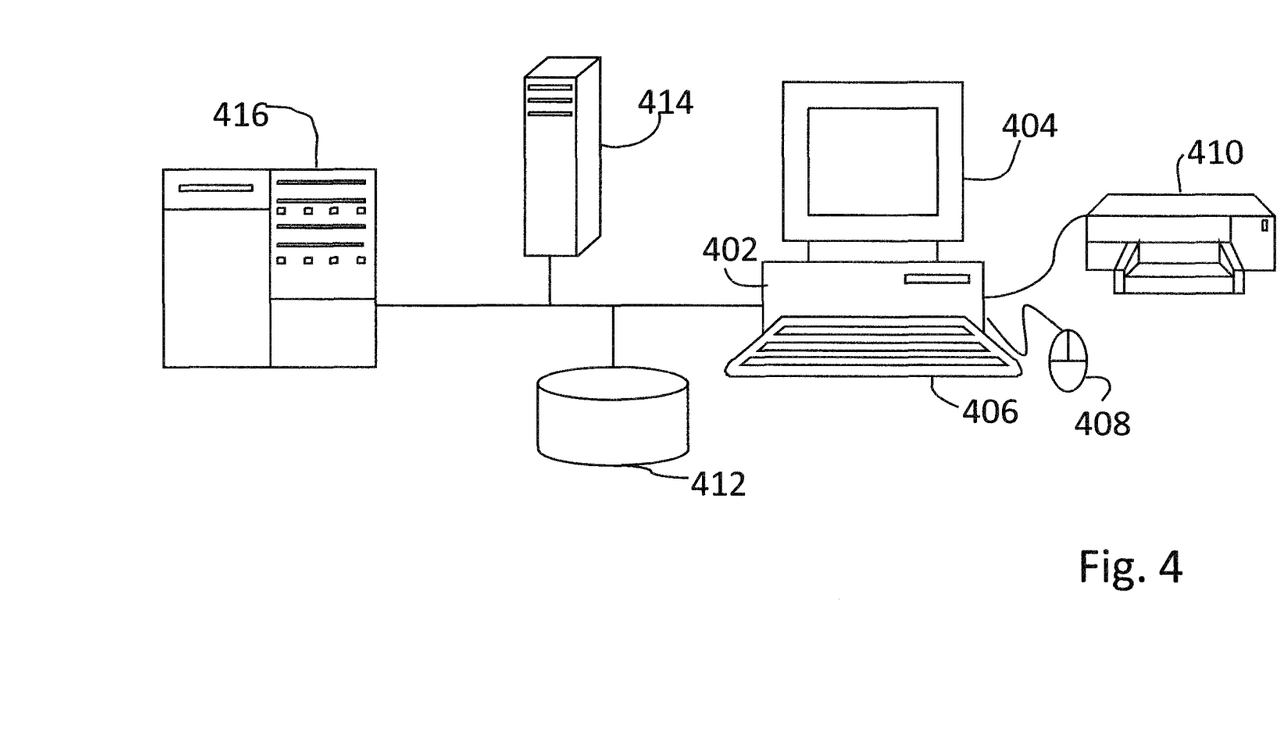
FIG. 4 illustrates a computer system in which the system and methods of the present disclosure may be carried out.

Referring now to FIG. 4, the systems and methodologies of the present disclosure may be carried out or executed in a computer system that includes a processing unit 402, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit 402 by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen 404 for presenting output displays and providing a display through which the user may input data and interact with the processing system, for instance, in cooperation with input devices such as the keyboard 406 and mouse device 408 or pointing device, or a microphone coupled with a speech recognition system. The computer processing system may be also connected or coupled to one or more peripheral devices such as the printer 410, scanner (not shown), speaker, and any other devices, directly or via remote connections. The computer processing system may be connected or coupled to one or more other processing systems such as a server 410, other remote computer processing system 414, network storage devices 412, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems (e.g., 402, 414, 416), or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for correcting error in digital text using fact repositories, comprising:
    searching computer data repository storing information for one or more relevant facts associated with input digital text;
    extracting one or more facts postulated in the input digital text;
    comparing said one or more facts postulated in the input digital text with said one or more relevant facts;
    analyzing one or more differences between said one or more facts postulated in the input digital text and said one or more relevant facts resulting from the comparing step; and
    transforming the input digital text into corrected digital text by correcting the input digital text using evidence resulting from the analyzing step,
    wherein the analyzing further comprises producing a score identifying a degree of inconsistency between said one or more facts postulated in the input digital text and said one or more relevant facts, and the transforming further comprises highlighting the corrected digital text in a manner to indicate a certainty level of correction.

2. The method of claim 1, wherein the digital text is generated by one or more of OCR, speech recognition device, handwriting recognition device, or combinations thereof.

3. The method of claim 1, wherein the digital text include metadata.

4. The method of claim 1, wherein the evidence is generated using machine learning.

5. The method of claim 1, wherein said one or more relevant facts associated with input digital text are represented as rich data structures.

6. The method of claim 1, wherein the comparing step further includes constructing a mapping between elements of said one or more facts postulated in the input digital text and said one or more relevant facts.

7. The method of claim 1, wherein the analyzing step includes using a model trained over a training corpus of facts.

8. A system for error correction using fact repositories, comprising:
    one or more fact repositories stored on one or more storage devices; and
    a correction module executable on a computer processor, the correction module operable to search the fact repositories for one or more relevant facts associated with input digital text, the correction module further operable to extract one or more facts postulated in the input digital text and determine one or more differences between said one or more facts postulated in the input digital text and said one or more relevant facts retrieved from the fact repositories, the correction module further operable to transform the input digital text into corrected digital text using evidence resulting from the determined differences,
    wherein the correction module is further operable to produce a score identifying a degree of inconsistency between said one or more facts postulated in the input digital text and said one or more relevant facts, and further operable to highlight the corrected digital text in a manner to indicate a certainty level of correction.

9. The system of claim 8, further including an output device for outputting the corrected digital text.

10. The system of claim 9, wherein the output device includes a display device, a storage device, or network communication interface device, or combinations thereof.

11. The system of claim 8, wherein the one or more fact repositories include one or more databases storing information.

12. The system of claim 8, wherein the one or more fact repositories are accessed over the Internet.

13. The system of claim 8, wherein the input digital text is generated from one or more of OCR, speech recognition device, or handwriting recognition device, or combinations thereof.

14. The system of claim 8, further including an interface connected to one or more automatic recognition devices that generate the input digital text, the interface operable to receive the input digital text.

15. The system of claim 8, wherein the correction module includes:
    a querying module operable to query one or more repositories for relevant facts associated with elements of the input digital text;
    a facts extraction module operable to extract postulated facts in the input digital text;
    a comparison module operable to determine differences between the postulated facts and the relevant facts; and
    a correction model operable transform the input digital text into corrected digital text based on the differences between the postulated facts and the relevant facts.

16. The system of claim 15, wherein the correction model includes a machine learning module.

17. The system of claim 15, wherein the correction model includes an evidence gathering module.

18. A program storage memory device readable by a machine, tangibly embodying a program of instructions executable by the machine to perform a method of modeling and evaluating impact on service components, comprising:
    correcting error in digital text using fact repositories, comprising:
        searching computer data repository storing facts for one or more relevant facts associated with input digital text;
        extracting one or more facts postulated in the input digital text;
        comparing said one or more facts postulated in the input digital text with said one or more relevant facts;
        analyzing one or more differences between said one or more facts postulated in the input digital text and said one or more relevant facts resulting from the comparing step; and
    transforming the input digital text into corrected digital text by correcting the input digital text using evidence resulting from the analyzing step,
        wherein the analyzing further comprises producing a score identifying a degree of inconsistency between said one or more facts postulated in the input digital text and said one or more relevant facts, and the transforming further comprises highlighting the corrected digital text in a manner to indicate a certainty level of correction.

19. The program storage memory device of claim 18, wherein the digital text is generated by OCR, speech recognition device, handwriting recognition device, or combinations thereof.

20. The program storage memory device of claim 18, wherein the digital text include metadata.

* * * * *